United States Patent [19]
Weber

[11] 3,853,307
[45] Dec. 10, 1974

[54] CONDUIT SYSTEM FOR THE TRANSPORT OF HOT GASES, ESPECIALLY HOT-BLAST AIR FOR A BLAST FURNACE, WHICH CONDUIT SYSTEM INCLUDES A CONNECTOR PLUG

[75] Inventor: Hendrik Gustaaf Otto Weber, Heiloo, Netherlands

[73] Assignee: Hoogovens IJmuiden BV, IJmuiden, Netherlands

[22] Filed: July 18, 1973

[21] Appl. No.: 380,237

[30] Foreign Application Priority Data
July 19, 1972 Germany.......................... 2235416

[52] U.S. Cl...................... 266/30, 285/47, 285/156
[51] Int. Cl............................................ F27b 1/10
[58] Field of Search ............ 266/43, 29, 30; 285/47, 285/55, 156; 138/147, 149

[56] References Cited
UNITED STATES PATENTS

| | | | |
|---|---|---|---|
| 987,098 | 3/1911 | Scott.................................... | 285/55 |
| 1,013,961 | 1/1912 | Shutts et al......................... | 266/30 |
| 1,951,677 | 3/1934 | Rosener............................... | 285/55 |
| 2,154,813 | 4/1939 | Heuer................................... | 266/43 |
| 2,705,414 | 4/1955 | Rose..................................... | 138/147 |
| 3,116,756 | 1/1964 | Alderson.............................. | 285/156 |
| 3,595,550 | 7/1971 | Greer.................................... | 266/43 |

Primary Examiner—Gerald A. Dost
Attorney, Agent, or Firm—Cushman, Darby & Cushman

[57] ABSTRACT

The present invention relates to a conduit system for the transport of hot gases, preferably of hot-blast air for a blast furnace, comprising a substantially horizontal pipeline of metal having a refractory brickwork interiorly thereof, whereby this conduit system includes at least one connector plug or connection (branch) point, gussets or the like having a pipe section of substantially equal pipe or inner diameter connected thereto, wherein the connection is bevelled by means of parts of a cylindrical surface which parts at the two pipelines connected to each other are joined in such a manner that the common transitions of the connected pipelines and the bevels at the upper and lower sides of the connector plug or connection point are formed as planar surfaces, whereby the refractory lining of the upper planar surfaces is formed as a suspended brick construction.

7 Claims, 5 Drawing Figures

CONDUIT SYSTEM FOR THE TRANSPORT OF HOT GASES, ESPECIALLY HOT-BLAST AIR FOR A BLAST FURNACE, WHICH CONDUIT SYSTEM INCLUDES A CONNECTOR PLUG

The present invention relates to a conduit system for the transport of hot gases, comprising a substantially horizontal pipeline of metal having a refractory brickwork interiorly thereof, whereby this conduit system includes at least one connector plug, gussets or the like having a pipe section of substantially equal pipe or inner diameter connected thereto.

Conduit systems of this kind are used e.g. in blast furnaces for conveying the hot-blast air from a plurality of hot-blast furnaces or regenerators to a common hot-blast conduit which opens into a ring conduit or closed-circuit pipeline extending around the blast furnace. However, the invention is not only applicable to hot-blast conduits of blast furnaces, but may be used with advantage in a number of other applications.

In the case of the connector plugs of the hot-blast discharge positions into the hot-blast conduit and of the connection of the hot-blast conduit to the ring conduit, very severe requirements are frequently imposed on the construction of the refractory lining of the pipelines. This construction must resist extremely high temperatures (up to about 1,500°C) and, at the same time, great and frequent temperature variations (over several hundred degrees Centigrade). Also, the thermal expansions extending in different directions have to be taken up at these connector plugs, unless such expansions are already compensated in another manner. In view of these extremely high stresses, a major difficulty resides in the statically quite unstable construction of the refractory brickwork at the transitions between the lining of the hot-blast conduit and the connector provided thereon. In particular, the uppermost point of this transition is substantially almost unsupported relative to the adjacent brickwork portions. Therefore, it is frequently found that it is just these connections which restrict a further increase of the hot-blast temperature, because in the case of a further increase of the temperature and/or an increased pipe diameter the brickwork would yield at just these critical points which could result in catastrophic accidents.

It is the object of the invention to avoid the drawbacks of the conventional construction, and particularly to modify the refractory brickwork of the conduit system at the indicated critical places in such a way that an absolutely operationally safe support of the lining is obtained even in the case of extremely high temperatures.

According to the invention, the transitions of the adjoining pipelines are constructed in such a manner that the connection is bevelled by means of parts of a cylindrical surface which parts at the two pipelines connected to each other are joined in such a manner that the common transitions of the connected pipelines and the bevels at the upper and lower sides of the connector plug or connection point are formed as planar surfaces, whereby the refractory lining of the upper planar surfaces is formed as a suspended brick construction.

In this way, the connector plug is formed by the association of three cylindrical surface portions of equal diameters intersecting each other in a single surface, and by two planar surfaces which are arranged parallel to the surface in which the cylindrical surface portions intersect each other and which enclose these cylindrical surface portions between them. While the lining on the lower planar surface may be simply bricked up thereon, the refractory lining of the upper planar surface, however, is constructed as a suspended brick construction. In this way, the danger is eliminated that parts of this archlike portion of the brickwork are not sufficiently supported relative to each other so that they could collapse into the conduit.

It is known to use roof arches with suspended bricks in Siemens-Martin or open hearth furnaces. However, in such case much greater surface areas are bridged which mostly do not have a flat shape, but a more arched configuration. Now, a very distinct difference with respect to the known suspended roof arches in furnaces consists in the fact that the roof arches over a furnace space are stressed by an almost stationary or only slowly moving gas atmosphere at substantially atmospheric pressure only. On the other hand, a hot-blast conduit can be compared with a high pressure vessel wherein extremely high gas flow velocities may occur. In a conduit of this type, the bricks of the brickwork must be suspended from a steel conduit wall which, at the same time, must ensure a gas-tight seal, too. In order to be able to resist a high pressure, this conduit wall must not become too hot, whereby the suspension means within the closed conduit space must remain sufficiently cool. This imposes heretofore unknown, severe requirements to a suspended construction interiorly of pipelines.

If the connection comprises a pair of pipelines the ends of which open into each other at a specific acute angle, it is sufficient to provide a single bevel of the described kind, namely only at the position of the inner angle between the pipelines.

Even if the connection is formed by a continuous pipe-line and a pipeline adjoining the former at an acute angle, it is often sufficient to provide a single bevel, and that on the side of the acute angle only.

However, it is not seldom that the adjoining pipeline will open into the continuous pipe section substantially at right angles. In such cases, it is preferable according to the invention to provide a bevel on both sides of the connector plug. In the case of a right-angled connection, these bevels then should be arranged preferably symmetrically relative to each other.

The flat suspended brick construction need be provided only within the region of the intersecting cylindrical surfaces. In view of an improved stability of the construction, according to the invention it is preferred that the flat suspended brick construction extends beyond the uppermost circumscribing lines of the various cylindrical surfaces, such that the cylindrical arch portions join the flat suspended brick construction at an angle.

In order to ensure a good suspension of the suspended brick construction, the latter includes shaped bricks having T-shaped recesses which are placed over metallic profiles or channels secured to the metallic wall of the conduit. Preferably, the metallic profiles are formed from a heat resistant steel. For ease of assembly of the suspended brick construction, and also to provide a movability of this construction during the heating of the conduit system, according to the invention the metallic profiles may be movably suspended by means of yokes. Regardless of this movability, nevertheless a good gas-tight seal of the arch may be ensured by the fact that the refractory shaped bricks forming the suspended brick construction engage into each other with a groove and key configuration. In this manner, the stability of the suspended brick construction is additionally improved, too.

In a conduit system in which the gas flow velocity and/or the gas temperature are very high, it is advisable to produce the suspended shaped bricks from layers of different materials, whereby the part positioned interiorly of the conduit consists of a wear-resistant, refractory material, while the radially outer side of the bricks consists of a material of good thermal insulating properties.

Below, the invention is described in detail by referring to the accompanying drawings, wherein.

Figure 1:
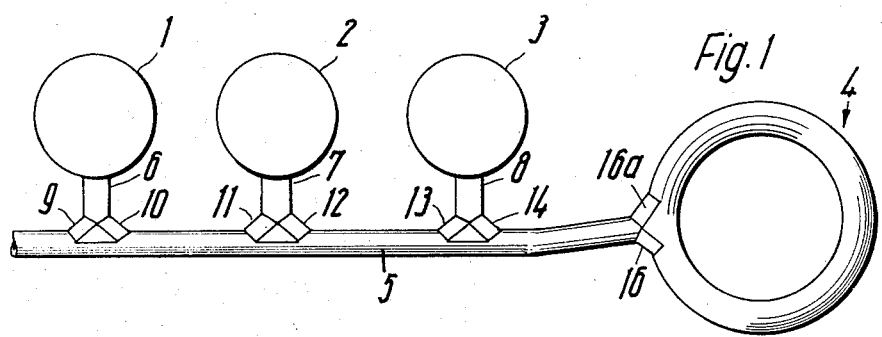
FIG. 1 shows a hot-blast conduit for a blast furnace.

FIG. 1 shows schematically three regenerators 1, 2 and 3 for a blast furnace, as well as a hot-blast ring conduit 4 encircling the blast furnace. By means of the hot-blast conduit 5, the hot-blast air is delivered to the ring conduit 4, whereby the hot-blast air is periodically introduced into the hot-blast conduit 5 from one of the regenerators 1, 2 or 3 through hot-blast intermediate or connector lines 6, 7 and 8. In the schematical showing of FIG. 1, the hot-blast valves, expansion compensators and anchoring means are omitted because they are not necessary for the understanting of the invention.

Figures 2, 3:
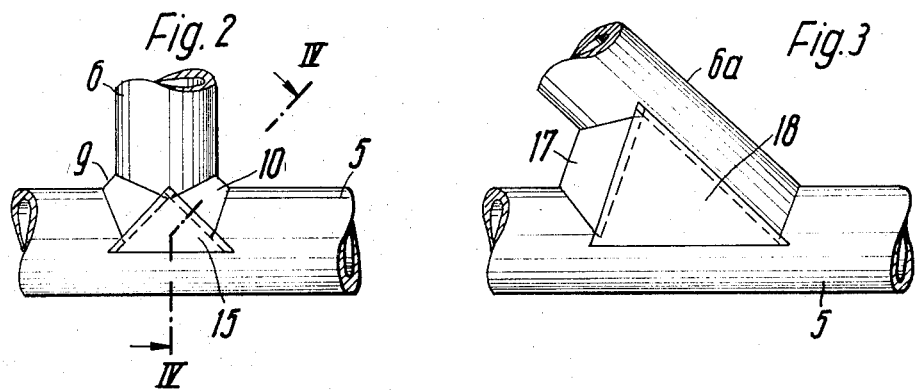
FIG. 2 shows a single connector plug on the hot-blast conduit of FIG. 1.
FIG. 3 shows a modified embodiment of this connector plug.

At the connector plugs where the intermediate lines 6, 7 and 8 are connected to the hot-blast conduit 5, and also at the connection between the conduit 5 and the ring conduit 4, there are provided bevels 9 to 14, and 16 and 16a in the angles defined by the conduits. FIG. 2 shows the point of connection of line 6 to the hot-blast conduit 5 in greater detail and on enlarged scale. Lacking the bevels 9 and 10, the circular-cylindrical outer surfaces which are defined by the pipelines 6 and 5 would intersect along a pair of ellipses which are disposed in a pair of surfaces normal to each other and symmetrical relative to the line 6. The triangle or wedge-like portion enclosed by these ellipses is the cause of the problems which arise in the refractory lining or brickwork of the pipelines. This brickwork, particularly at the free end thereof, is not, or insufficiently only supported against the respectively adjacent brickwork.

The bevels 9 and 10 are formed as portions of circularcylindrical surfaces having the same diameter as the lines 5 and 6. The bevels likewise intersect the outer surfaces of the pipelines 5 and 6 along ellipses (see FIG. 2).

Within the spherical triangle which is defined by the uppermost circumscribing lines of the various cylindrical surfaces, the end adjacent the conduit 5 would normally form a triangle at the upper and lower sides, whereby one tip of the triangle is the outermost end of the line 6. According to the invention, this triangle is replaced by a flat fitting 15 of sheet steel, and that each at the upper side and at the lower side of the connector plug. As shown in FIG. 2, this flat fitting 15 extends even beyond the uppermost circumscribing lines of the various cylindrical surfaces. In this manner, it is obtained that the cylindrical surfaces joining this triangular fitting 15 adjoin the planar surface of the triangular fitting 15, whereby the stability of the brickwork is improved as shown in FIG. 4.

FIG. 3 shows a slightly modified construction which results if one of the intermediate lines 6, 7 or 8 joins the hot-blast conduit 5 at an acute angle as shown for the intermediate pipe 6a. In this case, it is only necessary to provide a bevel 17 at the side of the acute angle, because the flat triangle 18 positioned at that point as the upper sheet steel fitting requires a transition.

Figures 4, 5:
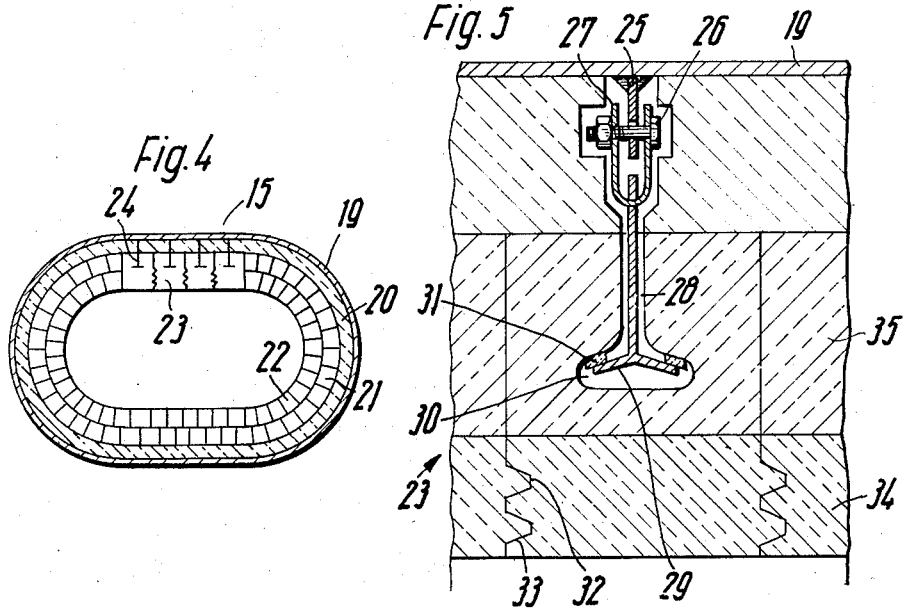
FIG. 4 shows a schematical view in section along lines IV—IV in FIG. 2.
FIG. 5 is an enlarged view to illustrate details of the sectional view of FIG. 4.

FIG. 4 shows in exemplary form the arrangement in which two insulating layers 20 and 21 and a refractory layer 22 are positioned one above the other within a steel jacket 19. At the position of the triangular, planar fitting 15, a number of rows of refractory shaped bricks 23 is mounted on the insulating layer 20, which bricks have recesses 30 by means of which they are slipped over metallic profiles 24. These metallic profiles 24 are secured to the jacket 19. In contrast with the mere schematical view of FIG. 4, in practice the number of the layers 20, 21 and 22 may be greater.

FIG. 5 shows on enlarged scale the details of the arrangement of the present mounting of the refractory shaped bricks 23 on the metallic profiles, also termed anchors. These anchors consist of mounting portions 25 to 29 wherein a T-section 28 forms the actual continuous part. This T-section 28 is suspended at various places of the jacket longitudinally in yokes 27 which, in turn, by means of bolts 26 are suspended from strips 25 which are securely connected to the jacket 19.

This type of suspension of the anchor provides for a certain movability of the shaped bricks 23 in longitudinal and transverse directions. Each shaped brick 23 is fitted with its recess 30 over a T-section 28, whereby the point of contact, however, is separately thermally insulated by the interposition of highly insulating ceramic wool 31 which is provided between a transverse web 29 at the end and the shaped brick 23. Most preferably, the recess 30 is completely filled with this material in order to avoid an overheating of the anchors themselves. Along their side faces, the shaped bricks 23 are provided with profiles so that they fit into each other with a groove 32 and a key 33. This not only improves the integrity of the arched roof, but also provides an improved thermal insulation. The shaped bricks per se consist of a pair of interfitting portions. The radially inner portion 34 consists of a hard, wear resistant and highly refractory material, while the radially outer portion 35 consists of a material having higher insulating properties. In this way, it is achieved that the lining or brickwork of the arch is resistant to the erosion of the hot gas flowing at high velocity through the interior of the pipe, whereby the anchors and yokes at the same time are sufficiently thermally shielded. It is advisable to produce the anchoring, i.e. the parts of the metallic profiles 24, from a heat resistant steel alloy.

What we claim is:

1. A conduit system for the transport of hot gases such as hot air blasts from a blast furnace, said system comprising a. a substantially horizontal metal pipeline having a refractory brickwork lining, b. a pipe section having substantially the same inner diameter as said horizontal pipeline, c. a connection between said pipeline and said pipe section, d. means for bevelling said connection, said means including members comprising portions of a cylindrical surface between said pipeline and said pipe section, e. means for joining said pipe section, pipeline, and bevelling members so that the common transitions of said pipe section, pipeline, and bevelling members at the upper and lower sides of said connection are formed as upper and lower planar surfaces, and f. means for providing a flat suspended brick construction as a refractory lining of said upper planar surface.

2. A conduit system as recited in claim 1 wherein said flat suspended brick construction extends beyond the uppermost subscribing lines of the individual cylindrical surfaces.

3. A conduit system as recited in claim 1 wherein said upper planar surface is metallic and wherein said flat suspended brick construction comprises refractory shaped bricks each having a T-shaped recess therein and metal profiles secured to said upper planar metallic surface, said T-shaped recesses receiving said metal profiles whereby said bricks are supported by said upper planar metallic surface.

4. A conduit system as recited in claim 3 wherein said metallic profiles are movably suspended by means of yokes.

5. A conduit system as recited in claim 1 wherein said flat suspended brick construction comprises refractory shaped bricks, said bricks of said construction connected to each other via a groove and key connection.

6. A conduit system as recited in claim 1 wherein said flat suspended brick construction comprises refractory shaped bricks and wherein each of said bricks is layered, the layer of each of said bricks disposed adjacent hot gases transported by said conduit system formed of a refractory material, and a layer of each of said bricks adjacent said refractory material layer formed of a material having good insulating properties.

7. A conduit system as recited in claim 6 wherein said layer of each of said bricks having good insulating properties has a T-shaped recess formed therein, said recess for receiving a metal profile for supporting said brick.

* * * * *